Feb. 8, 1949. K. O. LARSON 2,461,429
CONTINUOUSLY EXTENSIBLE, RETRACTABLE, AND COLLAPSIBLE STRUCTURE
Filed Jan. 2, 1947 4 Sheets-Sheet 3
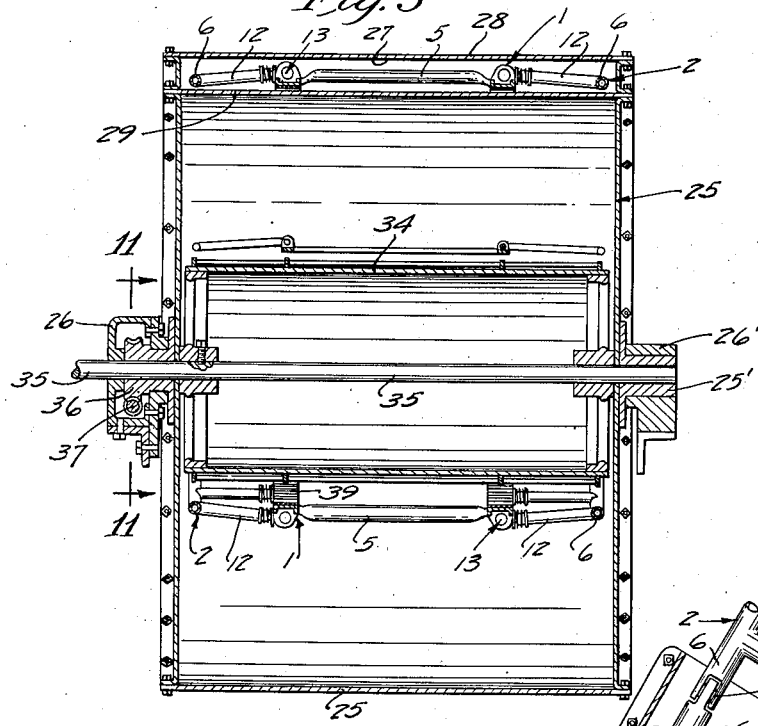
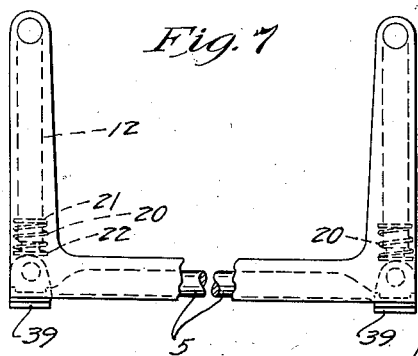
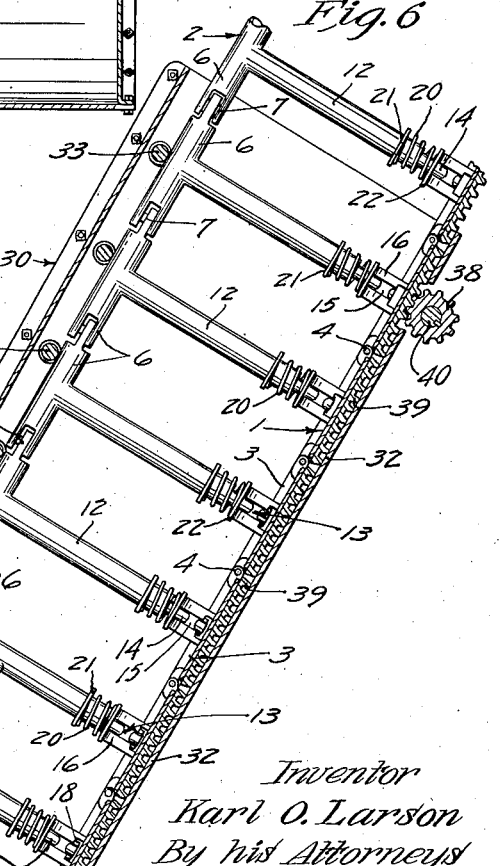
Inventor
Karl O. Larson
By his Attorneys
Merchant + Merchant

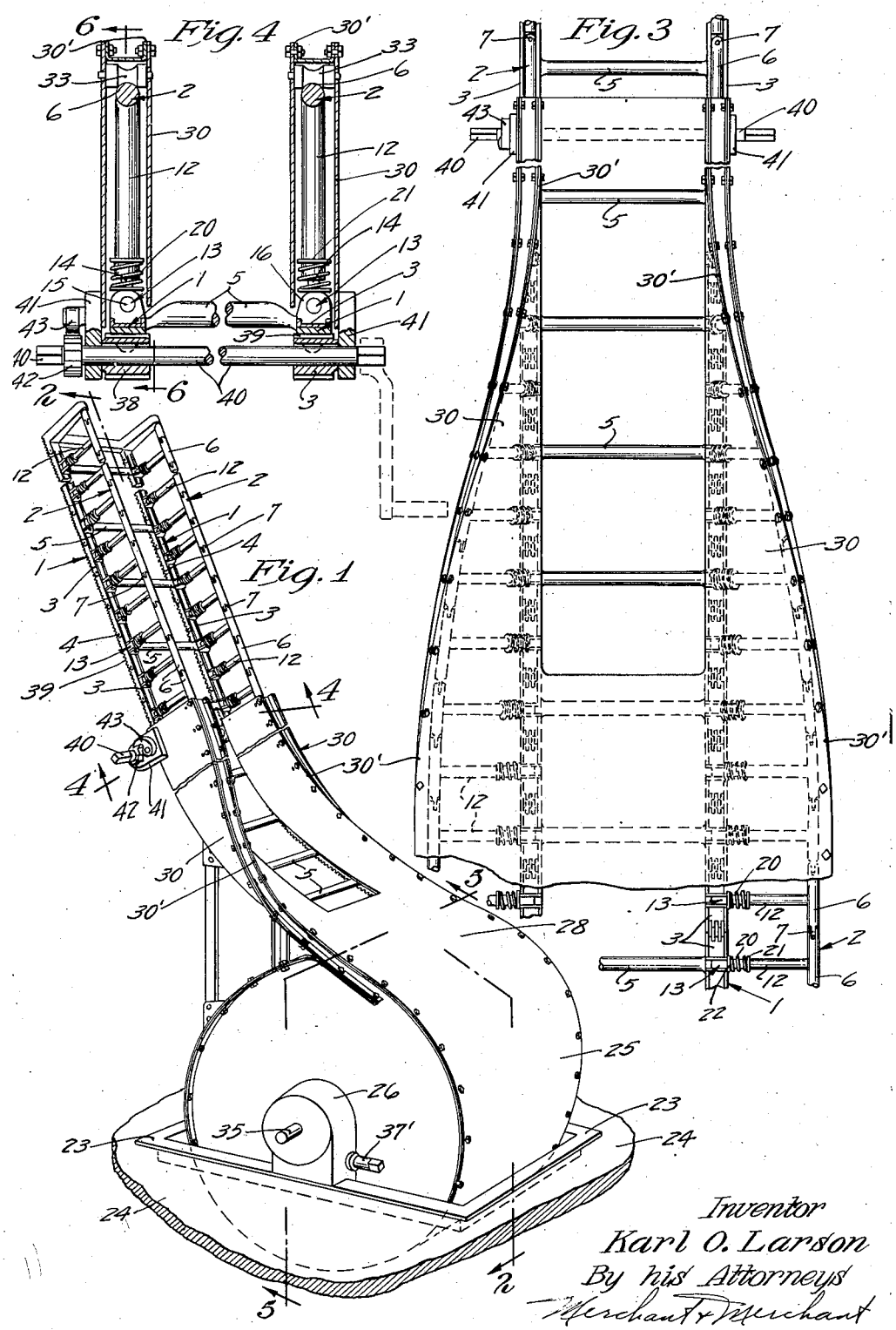

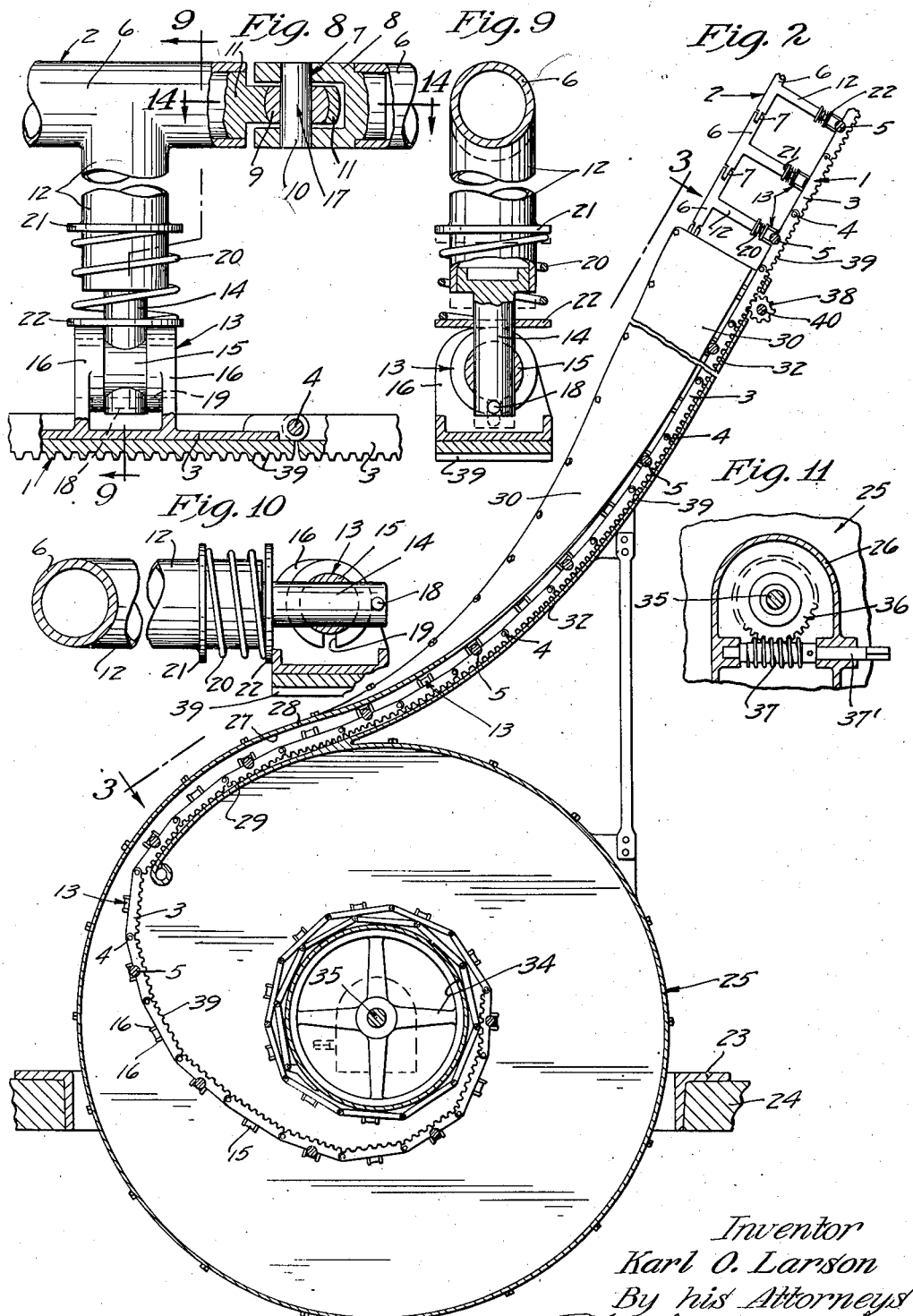

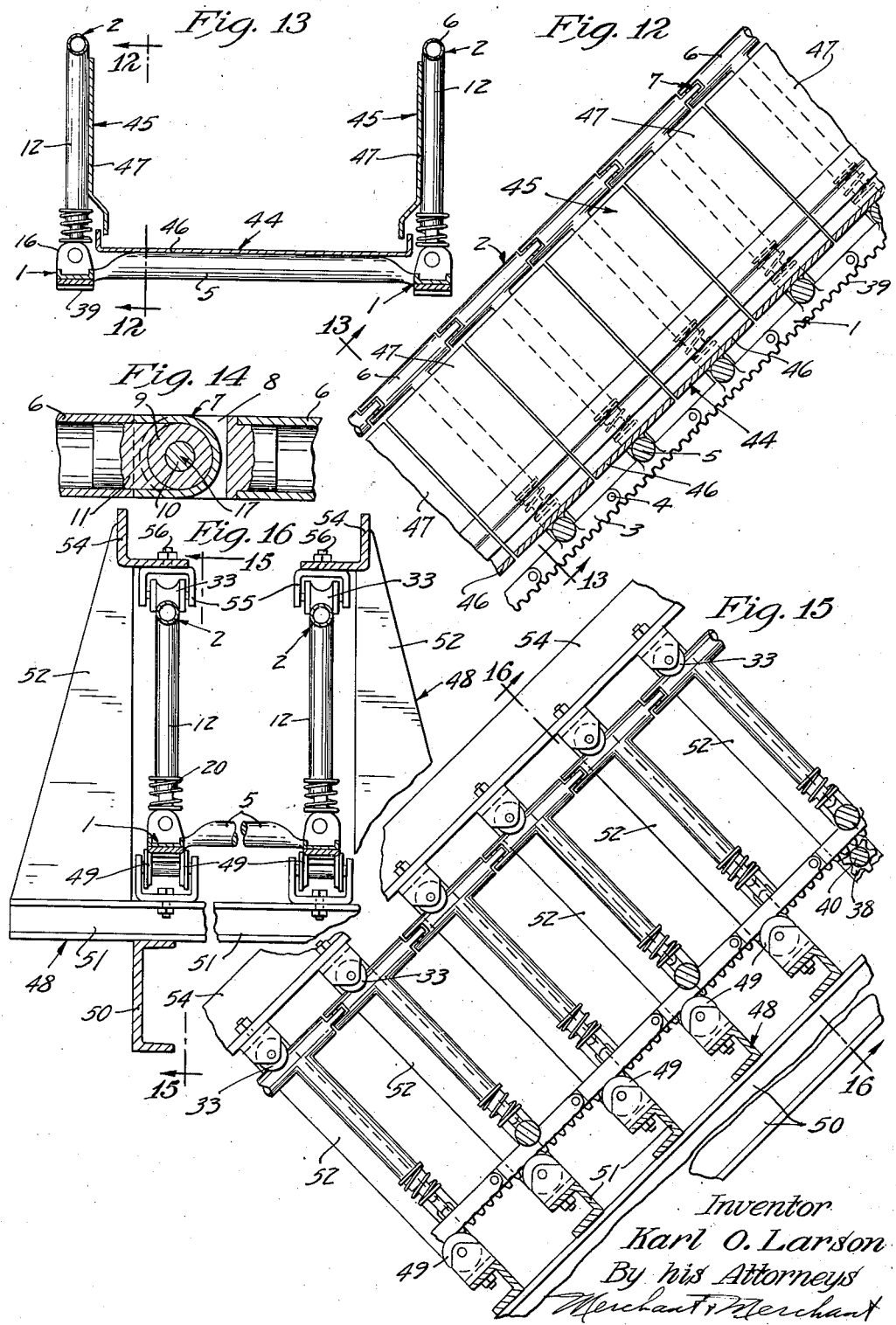

Patented Feb. 8, 1949

2,461,429

UNITED STATES PATENT OFFICE 2,461,429

CONTINUOUSLY EXTENSIBLE, RETRACTABLE, AND COLLAPSIBLE STRUCTURE

Karl O. Larson, Minneapolis, Minn.

Application January 2, 1947, Serial No. 719,778

29 Claims. (Cl. 228—41)

Generally stated, my present invention relates to elongated structures that are readily convertible from conditions of rigidity to conditions of collapsibility. The invention is adapted to a wide range of applications including extension ladders for use by firemen and the like to reach the upper stories and roofs of buildings, emergency extension bridges (mainly foot bridges) for use in various kinds of rescue work, extensible and retractable cranes or supporting arms, and extensible and retractable troughs or channels for conveyance of various materials and products of commerce.

More specifically stated, my present invention relates to collapsible structures of the above analogous types and kinds which are made up of longitudinally - aligned sections permanently joined together, that is, permanently joined to the extent that the joints need not be disassembled for purpose of conversion of the structures from conditions of rigidity to conditions of collapsibility.

In practicing the invention according to the preferred example illustrated, jointed, elongated structures of the kinds described and other analogous kinds may be made in widely-varying overall lengths and the longitudinally-extended sections thereof are progressively convertible from conditions of collapsibility to conditions of rigidity and vice versa, so that the structure may be stored and transported in a minimum of space and may be progressively projected from the place of storage in a condition of rigidity.

An object of the present invention is the provision of an elongated unitary structure which is readily convertible from a condition of rigidity to a condition of collapsibility.

Another and more specific object of the invention is the provision of a unitary structure of the kind described made up of a plurality of joined rigid sections, and which unitary structure is readily converted from a condition of rigidity to a condition of collapsibility and vice versa without coupling or uncoupling of any of its joints.

A still further and more specific object of the invention is the provision of an improved, elongated, unitary structure of the kind last described wherein the longitudinally-extended sections thereof may be progressively converted from conditions of collapsibility to conditions of rigidity.

A still more specific object of the invention is the provision of an elongated structure having the characteristics last above defined together with mechanism for continuously-projecting and retracting the structure, said mechanism involving means for continuously converting the sections of the structure from conditions of collapsibility to conditions of rigidity under extending movements of the structure and for progressively converting the structure sections from conditions of rigidity to conditions of collapsibility or non-rigidity under retracting movements of the structure. In the preferred embodiment of the invention illustrated, the several sections of the structure are provided with latch mechanism for independently releasably locking the sections in conditions of rigidity, and means are provided for progressively acting upon these latch mechanisms under projecting movements to set the latches in locked position and are progressively operative on the latch mechanism on retracting movements thereof to set the latches in inoperative or unlocked positions.

The above and other highly important objects and advantages of the invention will be made apparent from the following specification, claims and appended drawings.

Fig. 1 is a perspective view of an extension ladder and ladder-receiving, supporting, and dispensing structure constructed in accordance with the invention;

Fig. 2 is an enlarged longitudinal sectional view taken on the line 2—2 of Fig. 1;

Fig. 3 is a fragmentary plan view taken on the line 3—3 of Fig. 2;

Fig. 4 is a transverse sectional view, on a still further enlarged scale, taken on the line 4—4 of Fig. 1;

Fig. 5 is a transverse sectional view taken on the line 5—5 of Fig. 1 and on a somewhat enlarged scale;

Fig. 6 is a fragmentary sectional view taken on the line 6—6 of Fig. 4;

Fig. 7 is a view in elevation of the free or extended end of the extension ladder structure of Fig. 1;

Fig. 8 is a still further enlarged fragmentary detail view, in side elevation and with some parts broken away, of the extension ladder structure of previous figures;

Fig. 9 is a detail sectional view taken on the line 9—9 of Fig. 8;

Fig. 10 is a view similar to Fig. 9 but showing the hand rail and associated parts tipped to their inoperative or collapsing positions;

Fig. 11 is a fragmentary sectional view on an enlarged scale taken on the line 11—11 of Fig. 5;

Fig. 12 is a longitudinal sectional view taken on the line 12—12 of Fig. 13 and illustrating a somewhat modified form of the invention;

Fig. 13 is a transverse sectional view taken on the line 13—13 of Fig. 12;

Fig. 14 is a detail sectional view taken on the line 14—14 of Fig. 8;

Fig. 15 is a fragmentary longitudinal sectional view taken on the line 15—15 of Fig. 16 showing a modified form of supporting, guiding and converting means for ladder and other extensible and contractible devices of the invention; and Fig. 16 is a detail sectional view taken on the line 16—16 of Fig. 15.

(Description—Figs. 1 to 11, inclusive)

In Figs. 1 to 11, inclusive, the invention is shown as embodied in an extension ladder structure and one form of handling mechanism therefor is illustrated. The extension ladder of these figures comprises laterally-spaced parallel rails 1, which may hereinafter be singularly or jointly referred to as main members, and laterally-spaced parallel truss members 2, which, in the present instance, serve also as hand rails. The ladder rails or members 1 each comprise a longitudinally-extended series of sections 3, which sections are connected together by hinge joints for movements on axes extending transversely of the structure. The axes of hinge joints of each ladder rail or main member are aligned with the axes of the joints between sections of the opposite ladder rail. The hinge joints between longitudinally-adjacent ladder rail sections are best shown in Figs. 6 and 8 and involve hinge pins 4. Laterally-opposite sections 3 of the spaced ladder rails or main members 1 are rigidly connected by ladder rungs 5, which, as will hereinafter be seen, form the bottom of a channel-like structure when the parts are operatively positioned.

The hand-rail acting portions of the truss members 2 are each made up of series of sections 6 (preferably tubular sections). Longitudinally adjacent sections 6 are connected by universal hinge joints 7 allowing limited swivelling and universal swinging movements between adjacent sections 6.

A preferred form of these hinge joints 7 is shown best in Figs. 8 and 14, and each said joint is comprised as follows: one end of each tubular section 6 is provided with a bifurcated head 8 telescopically applied therein in the manner of a plug and welded or otherwise rigidly secured thereto as best shown in Fig. 14. The opposed inner surfaces of the spaced flanges of these bifurcated joint heads 8 are flat, and parallel to one another and the outer surfaces thereof are cross-sectionally segmental. Pivoted and axially slidable within each bifurcated head 8 is a ball-acting ring 9 having flat surfaces spaced from the opposed inner surfaces of the bifurcated head 8 and having a spherical peripheral surface intermediate its flat ends. Preferably, and as shown, the ball-acting elements 9 are mounted in the bifurcated heads 8, for pivotal and axial sliding movements, on pivot pins 10 extending therethrough and the opposite flanges of the bifurcated heads 8 and press fit in the latter. The pivot or hinge pins 10 (see particularly Fig. 8) are co-axially-aligned with the flat opposed surfaces of the rings 9, and the axis of each of these pins is located in a plane extending transversely of the extended structure and intersecting the axis of the hinge pin 4 of an adjacent hinge joint between adjacent ladder rail-forming main member sections. It may also be said that the axes of the pins 10 extend in the direction of the depth of the truss members 2. The ball-acting rings 9 (see particularly Fig. 14) are seated in mating spherical sockets formed in tongues of joint heads 11 telescopically applied in and welded or otherwise rigidly secured to adjacent ends of longitudinally-adjacent tubular truss member sections 6. In connection with the joints 7, it is important to note that the head elements 11 are spaced from the opposite flanges of the head elements 8 to allow limited swivelling and universal swinging movements between adjacent sections 6 of members 2, in addition to relative axial movements between joint head elements 8 and 11.

In a preferred embodiment of the invention illustrated, the truss member sections 6 are connected to adjacent ladder rail-forming main member sections 3 by struts 12 and compound pivot or hinge joints 13. The struts 12 extend approximately perpendicular to the longitudinal direction of the connected sections 3 of the ladder rail-acting main members 1. The upper end portions of these struts 12 are tubular and are welded or brazed to the longitudinally-extended truss member sections 6 and form parts thereof. In the preferred arrangement, the lower or inner end portions of these struts 12 are diametrically reduced to provide pivot pin-acting shanks 14. These pivot pin-acting shanks 14 are preferably solid and, as shown, are provided with enlarged heads telescopically applied in the tubular portions of the struts 12 and permanently secured thereto by welding, brazing or the like.

The universal hinge joints 13 each comprise the pivot pin-acting shanks 14 of the struts 12, a body 15 in which the pivot pin-acting shanks 14 of the struts are pivoted, and opposed bearing flanges 16 rigidly carried by the ladder rail-forming main member sections 3 and in which the said bodies 15 are pivoted. In the preferred arrangement illustrated, the bodies 15 are in the nature of pivot pins extending between and having their opposite ends pivoted in opposite co-operating flanges 16 on axes extending parallel to the longitudinal directions of their respective cooperating main member sections 3. By reference particularly to Fig. 8, it will also be seen that, in the preferred embodiment illustrated, the axes of the pivot pin-acting shanks 14 intersect and are perpendicular to the axes of the bodies 15. The compound hinge joints 13 are located intermediate adjacent hinge pins or pivots 4 of the ladder rail-acting main sections 3.

With the arrangement described, it will be clear that the centers 17 of universal movements of the truss member section joints 7 are located in and are movable in planes intersecting the axes (hinge pins 4) of adjacent ladder rail-forming main member sections 3. By comparison with Figs. 9 and 10, for example, it will be seen that the truss members 2 are movable on the axes of bodies 15 from operative truss-acting positions shown in Fig. 9, wherein the centers of movement 17 of the truss member section joints 7 are angularly disposed (preferably perpendicularly disposed) with respect to the axes of the hinge joints (pins 4) of the ladder rail-acting main member sections 3 (see Fig. 9), to inoperative structure-collapsing positions, wherein the centers 17 of universal swinging movements of truss member joints 7 are aligned with hinge axes of the main member sections 3 (pins 4). From an examination of the drawings, it should be clear that the structure will be relatively very rigid when the parts are operatively positioned as in Fig. 9, but will be readily collapsible when the parts are inoperatively positioned as in Fig. 10.

For the purpose of independently and releasably locking the sections 6 of truss member 2 in their operative truss-forming positions, I provide independent latch mechanisms for each and every such section. In the preferred embodiment of the invention illustrated, these latch mechanisms each comprise the reduced diameter shank portion 14 of a truss member strut 12, a latch detent 18 in the nature of pins passed diametrically through and projecting outwardly of the inner end portion of a pivoted shank 14, and cooperating latch detent-receiving notches 19 in the inner peripheral portions of circular bosses formed on the opposed faces of cooperating pairs of flanges 16 (see particularly Figs. 8, 9 and 10). Portions of flanges 16 forming opposite walls of the notches 19 serve as opposed latch lugs or shoulders. The shank-acting portions 14 of the struts 12 are axially, slidably and pivotally mounted in the bodies 15 and are yieldingly biased outwardly towards their latched locked positions shown in Figs. 8 and 9 by coil compression springs 20 that are compressed between flanges 21 fast on the struts 12 and bearing washers 22 slidably mounted on the shank portions 14 of the struts 12 and bearing against the circular peripheral portions of the flanges 16. Hence, it is important to note that the latch mechanism just described not only locks the sections 6 of truss member 2 against lateral swinging movements on the axes of bodies 15, but pivotal movements on the axes of the strut shanks also positively locks the said sections 6 against 14. Hence, when the parts are in their operative positions of Figs. 8 and 9, the structure will be comparatively very rigid. From the drawings, it should also be apparent that when the parts are moved to their operative positions of Figs. 8 and 9, the latch mechanisms described will automatically lock, under the actions of springs 20, and that unlocking of the latches can only be accomplished by moving the shank portions 14 of the struts 12 inwardly, against the actions of springs 20, through the bodies 15 sufficiently to release the opposite ends of pins 18 from the notches 19. In this connection, it is important to note that the joints 7 allow, in addition to swivelling and universal swinging movements described, limited movements of each truss section 6 in respect to adjacent sections in a direction axially of the pins 10 of joints 7, and shanks 14 of joints 13, and this to the extent of the clearances between the joint elements 9 and 11 and the adjacent flanges of bifurcated heads 8, these last-described axial movements being particularly important in the locking and releasing latches of selected sections independently of others. If desired, sufficient clearance could be provided between the cooperating coupling or joint heads 8 and 9 of the universal joints 7 to permit locking and releasing of the latch mechanism of any truss section independently of any others thereof without requiring movement of any other truss section axially of its shank, but in the preferred embodiment of the invention, illustrated, the clearance between cooperating joint heads 8 and 9 is somewhat less than the depths of the latch notches 19, so that complete releasing or unlocking of any one latch can be accomplished only by taking up the clearances between cooperating heads 8 and 9 of a plurality of adjacent joints 7 (2, 3 or more, for example). However, attention is also called to the fact that special clearances between the heads 8 and 9 of joints 7 of the kind described, and for the purpose of facilitating the locking and unlocking function of the latches, may be dispensed with in favor of utilization of the normal working tolerances in the joints 7 and 13 for accomplishing the progressive locking and unlocking of the latch mechanisms. It will be understood, however, that in the latter instance, locking and unlocking functions of any particular latch will make use of the accumulated tolerances in a greater number of adjacent joints 6 and 13.

The handling and supporting means for the elongated jointed ladder structure illustrated may vary greatly in design. However, the form of supporting and handling means for the jointed ladder structure illustrated in connection with Figs. 1 to 11, inclusive, and 14 embodies such features and characteristics as are necessary to accomplish the desired result. This supporting and handling mean of Figs. 1 to 11, inclusive, (mainly Figs. 1, 2, 3, 4, 5, 6, and 11) comprise a rectangular mounting frame 23 adapted to be mounted in an apertured support such as a platform, and a drum-like container 25 mounted in the rectangular frame 23 through means including a combination bearing and gear box 26 adjacent one end of the drum and a bearing bracket 26' adjacent the other end of the drum. The drum-like container 25 is provided with a tangential outlet passage 27 shown best in Figs. 1, 2 and 5. The radially-outer or upper wall of this tangential passage 27 is indicated by 28, and the radially inner or bottom wall thereof by 29. The said passage 27 is substantially the full width of the drum 25 and said drum and passage are of sufficient width to receive the ladder structure when the hand rail providing truss members thereof are swung out laterally to their inoperative collapsing positions. Extending upwardly and outwardly from the drum passage 27 and forming integrally or rigid continuations thereof are like laterally-spaced tortuous channels 30, each receiving a plurality of sections 3 of an opposite ladder rail-acting main member 1 and a corresponding number of sections 6 of a connected hand rail providing truss member sections 6. Each of these channels 30 form a way for the sections 3, one of the ladder rail-acting main members 1 and associated sections 6 of a truss member 2, and each said channel is provided with a longitudinally-extended open slot to permit passage of the ladder rungs 5 therethrough.

By reference to Figs. 1, 2, and 3 it will be seen that the bottoms 32 of the channels 30, over which the bottoms of the sections 3 of main members 1 travel, are upwardly and outwardly curved from points of tangency with the common passage 27 to points thereon spaced somewhat from the free ends thereof and beyond which latter points the said bottoms 32 of the channels 30 are straight. In theory, the bottoms of the channels could be curved all the way to their ends, but in practice said channel bottoms will usually be made straight adjacent their free ends for distance equal to the length of several sections 3 and 6, the actual distance that the said channel bottoms are made straight being determined largely by the degree of rigidity of support demanded for the extended structure and the space in any particular structure required to accomplish the locking and unlocking functions of the latch mechanisms. By reference particularly to Figs. 1, 2 and 3, it will be seen that the spaced side walls of the channels 30 are laterally extended and parallel to the axes (hinge pins 4) of main members 1 at their points of tangency with the drum 25, but are angularly disposed with respect to said axes and preferably perpendicular thereto at and adjacent their free outer ends where the bottoms of said channels are flat. By still further reference to Figs. 1 to 3, inclusive, it will be seen that those portions of the upper edges 30' of the laterally inner spaced walls of opposite channels 30 lying longitudinally intermediate the relatively-perpendicular end portions of said side walls define compound curves that are tangent at opposite ends to opposite relatively-perpendicular end portions of their respective channel side walls. In other words, in the form illustrated, laterally-spaced side walls of the channels 30 are horizontally disposed at their inners ends and gradually rise from their inner toward their outer end portions where they are vertically disposed. In fact, in the form illustrated, one flat wall of each channel 30 is coextensive with the main member supporting bottom of the channel at its inner end. The sections 6 of truss members 2 are progressively moved from inoperative collapsing positions to operative truss-forming positions and vice versa during their passage through the channels 30; but, in the arrangement illustrated in Figs. 1 to 11, inclusive, and 14, such swinging movements of the sections 6 of truss members 2 from operative to inoperative positions during their passage through the channels 30 is accomplished independently of the sides of the channels by cam-acting guide rollers 33 journalled in said channels 30. In other words, the truss member sections 6 run out of frictional engagement with the walls of the channels 30 and are guided by the rollers 33, the side walls of said channels 30 serving mainly as supports for the rollers 33 (see particularly Figs. 4 and 6). The hand rail-acting tubular members 6 of the truss members 2 and their connecting joints 7 are exteriorally circular in cross section. The cam-acting guide members 33, of which there are a series for each channel 30, are spaced on centers preferably not less than the lengths of the sections 6 and have segmental grooves closely embracing the said cross-sectionally circular truss member sections 6. In the arrangement illustrated in Figs. 1 to 11, inclusive, the first rollers 33 adjacent the open outer end of each channel 30 is spaced from the bottom 32 of that channel (see Fig. 6) to snugly engage its cooperating truss section member 6 without producing any downward unlatching deflection of the engaged truss member sections against the latch-setting springs 20 thereof, whereas the next several succeeding rollers 33 are progressively more closely spaced from the bottom 32 of the channel 30 (see Fig. 6) to impart progressive unlatching movements to the truss member sections 6, over a distance equal to the length of several sections, under longitudinal extending movements of the jointed structure. In fact, in accordance with the specific example in Fig. 6, it will be seen that the complete latching and unlatching function of the truss member sections 6 is accomplished within the length of four or five sections, but it will be understood that this is a matter of design which can be widely varied. With still more specific reference to Fig. 6, it will be seen that the latch detent-forming pins 18 of the two extreme longitudinally outer sections of the jointed ladder structure are seated against the closed ends of their cooperating channels 19, whereas the latch detent-acting pins 18 of the bottom two sections of Fig. 6 are completely free of their cooperating notches 19.

For the purpose of the present example, it may be assumed that the free end portion of the channel shown in Fig. 6, wherein the latching and unlatching functions take place, is disposed perpendicular to the opposite or inner end portion of that channel 30. In some cases, it will no doubt be desirable to provide additional rollers 33 positioned like the upper roller 33 of Fig. 6 and which produce no unlatching function, but it will, nevertheless, be understood that stresses applied to and through those portions of the elongated ladder structure extending beyond the free ends of the channels 30 may be absorbed and distributed through even those sections whose latch mechanisms that are in the progress of being unlatched or re-set to fully latched positions.

In the form of the invention illustrated in Figs. 1 to 6 in particular, the longitudinally inner end portions of way-forming channels 30 have been shown as being tangent to the upper portion of the receiving drum 25. However, it should be understood that it will undoubtedly be desirable in many instances to make these channels tangent with the bottom portion of the receiving drum 25 or its equivalent, which latter arrangement makes for a more compact design than the one illustrated. The support 24 may be the floor or other part of a permanent structure or may be the platform, turntable, or other part of a mobile structure, such as a fire truck or analogous vehicle.

For the purpose of receiving and compactly storing the jointed ladder structure, I provide within the receiving drum 25 a reel 34 mounted fast on a shaft 35 and which shaft is journalled in the bearing and gear box 26, and an axially-projecting boss 25' fast on the drum 25. The boss 25' is in turn journalled in the bearing 26'. The shaft 35 extends outwardly through the bearing and gear box 26 for application of a suitable hand crank or power-operated mechanism, not shown. Retraction of the ladder structure may be accomplished by rotation of the reel 34.

Secured to the drum 25 in axial alignment with the boss 25' and journalled in the bearing and gear box 26 is a worm gear 36 through which the shaft 35 loosely extends. The worm gear 36 is driven by a worm 37 journalled in the gear box 26 and is provided with an extended shaft 37' for application of a hand crank or power-operated mechanism. The angle of the projected ladder structure may be adjusted by operation of the mechanism described.

Extension or projection of the jointed ladder structure is, in accordance with the present example, accomplished through the medium of pinions 38 and intermeshing ratchet 39, cut, broached, or otherwise formed in the bottoms of the sections 3 of main members 1. The pinions 38 are mounted on an operating shaft 40 journalled in bearing plates 41 on the channels 30. The extended ends of the pinion shaft 40 are preferably made angular for coupling to a suitable operating crank or power-operating mechanism. To prevent accidental retraction of the extended ladder structure, the pinion shaft 40 is shown as being provided with a ratchet 42 for cooperation with a pawl 43 pivoted to an adjacent bearing flange 41.

(*Operation—Figs. 1 to 11, inclusive, and 14*)

For the purposes of storage and transportation of the jointed ladder structure, said jointed ladder structure will be wound upon the reel 34, as best shown in Figs. 2 and 4, except for those portions thereof contained within the channels 30. When it is desired to extend the collapsed ladder structure, the pinions 38 are driven in a clockwise direction in respect to Fig. 2. As the pinions 38 are rotated in a clockwise direction in respect to Fig. 2, the main member sections 3 and the truss member sections 6 will progressively move outwardly through the channels 30 and during such movement the sections 6 of truss members 2 will be progressively swung from their laterally outwardly-extended inoperative collapsing positions to their upstanding operative truss-forming positions, under the influence of the cam-acting rollers 33. In this respect, it will be understood that the channels 30 are provided with rollers 33 at equally-spaced points throughout their lengths and that the several rollers 33 of each series thereof are so orientated each in respect to the others thereof that the centers of universal swinging or pivotal movements 17 of the joints 7 of each truss member 2, during their passage through a channel 30 define spaced points in a compound curve that is tangent at one end to a plane intersecting the centers of universal swinging movements of a plurality of operatively-positioned joints 7 and its other end is tangent to a plane intersecting the axes of universal swinging movements of a plurality of inoperatively-positioned joints 7. Of course it will be understood that the truss members will automatically be locked in their operative positions before being discharged from the channels 30 by engagement of the latch pins 18 in their cooperating notches 19. The structure described will be comparatively very rigid and strong when properly engineered and built of first-class materials, and may be made in various lengths up to 200 feet or more. Retraction of the extended structure and winding thereof upon the reel 34 is, of course, accomplished by releasing the pawls 43 and then rotating the reel 34 in a counter-clockwise direction with respect to Fig. 2, through the mechanism described or otherwise.

While the structure of Figs. 1 to 11, inclusive, and 14 was primarily designed for use as extension ladder structure and has been described as such, it will be understood that the structure of these figures is adaptable for numerous other uses, such, for example, as booms, cranes, supporting arms, and other analogous uses all without modification, and that the said structure of Figs. 1 to 11, inclusive, and 14 may be adapted, by slight modification within the spirit of the invention, to numerous other uses, some of which are exemplified in Figs. 12 and 13. In Figs. 12 and 13, I have shown the generally channel-shaped skeleton structure of Figs. 1 to 11, inclusive, and 14 equipped with sectional channel bottom-forming plates 44 and sectional channel side-forming plates 45. Except for the addition of the sectional plates 44 and 45 in Figs. 12 and 13, the structures of these figures may be assumed to be identical to the structure of Figs. 1 to 11, inclusive and 14, and to operate and function in exactly the same manner. By reference particularly to Fig. 12, it will be seen that the channel bottom-forming plate 44 is made up of an aligned series of plate sections 46 each approximately equal to the length of a main member section 3 and that the channel side-forming plates 45 are each made up of a plurality of aligned plates 47 each equal in length to an associated main member section 3 and truss member section 6. The bottom-forming plate sections 46 are each centered on and welded or otherwise secured to a cross member or rung 5 and the side plate sections 47 are each centered with respect to and welded or otherwise rigidly secured to a truss member strut 12. Adjacent bottom-forming plate sections 46 and adjacent side-forming sections 47 are closely spaced as shown best in Fig. 12 and, of course, it is desirable that the said spaces be aligned with the axes of the joints between main member sections 3.

The modified structure of Figs. 12 and 13 is obviously very desirable for use as an extension bridge, for example, and for use as an extensible and retractable trough, channel or chute, for conveyance of various materials and products of commerce.

(Description of Figs. 15 and 16)

In Figs. 15 and 16, I have shown a somewhat modified arrangement for supporting the extended structure and for progressively converting the same from a condition of collapsibility to a condition of rigidity and vice versa under longitudinal movements thereof. In these figures, the extensible and retractable ladder structure is identical to the ladder structure shown in Figs. 1 to 11, inclusive, and 14, as are also the cam-acting guide rollers for moving the truss members of the ladder structure between operative and inoperative positions, and all parts in these figures identical to parts of Figs. 1 to 11, inclusive, and 14 are indicated by like characters. In these Figs. 15 and 16, however, the channels 30 of the previously-described figure whose function is largely that of supporting the rollers 33 and supporting and guiding the sections 3 of the main members 1, have been omitted in favor of a skeleton framework 48 and main member guide rollers 49. The skeleton framework 48 may take various different forms but, as illustrated, comprises laterally-spaced, parallel, longitudinally-directed beams 50 extending from and anchored to a suitable supporting structure, such as the drum 25, for example, and which beams 50 may be assumed to curve outwardly and upwardly from the support much as do the bottom portions or walls 32 of the channels 30 of Figs. 1, 2 and 3. The said skeleton framework further comprises a series of transversely-extending cross members 51, strut-acting members 52, and curved longitudinal beams 54. The beams 54 are curved much as are the portions of the walls of the channels 30 immediately radially outwardly of the rollers 33 of Figs. 1 to 11. The rollers 33 of Figs. 15 and 16 are directly journalled in U-shaped brackets 55 that are bolted or otherwise rigidly secured to the beams 54 as at 56. In Figs. 15 and 16, the series of rollers 33 for each truss member 2 may be assumed to correspond in numbers, spacing, and orientation to the rollers 33 of Figs. 1 to 11, inclusive.

Probably the main advantage in the structure of Figs. 15 and 16 over that of the structure of Figs. 1 to 11, inclusive, and 14 is the use of the rollers 49 for supporting and guiding the main member sections 3 of the ladder structure, whereby to reduce to a minimum frictional resistance to extending and retracting movements of the ladder or analogous jointed structure. By reference particularly to Fig. 16, it will be seen that the rack teeth 39 of the main member sections 3 have been reduced in width and the bottom laterally-spaced edges of said sections 3 have been rounded to conform to the concave surfaces of the rollers 49 of Figs. 15 and 16 which serve both to carry the radial load imposed thereon and to guide the main member sections 3 against laterally-shifting movements. Preferably and as shown in Fig. 15, each roller 49 is spaced directly under a roller 33, but this may be varied without departing from the spirit of the invention. In referring to Fig. 16, it should be borne in mind that there are a spaced series of so-called strut members 52 in the skeleton framework described and that these progressively change shape along that portion of the structure where the side-acting truss members are being moved from operative to inoperative positions.

What I claim is:

1. In an elongated structure of the class described, an elongated main member comprising a longitudinally-aligned plurality of rigid sections hinged together for movements on axes extending transversely of the structure, an elongated truss member generally parallel to the main member and comprising a longitudinally-aligned plurality of rigid sections, adjacent truss member sections being connected by joints permitting limited swivelling and universal swinging movements therebetween, said truss member sections being connected to adjacent main member sections by joints permitting limited pivotal movements on axes extending longitudinally and transversely of the structure, the centers of universal swinging movements of the joints between adjacent truss member sections being located in and movable in planes extending transversely of the structure and including the axes of joints between adjacent main member sections, the said joints between the truss member sections and main member sections allowing swinging movements of the truss member sections from operative truss-forming positions to inoperative collapsing positions wherein the centers of universal movements between truss member sections are aligned with hinge axes of main member sections.

2. In an elongated structure of the class described, an elongated main member comprising a longitudinally-aligned plurality of rigid sections hinged together for movements on axes extending transversely of the structure, an elongated truss member generally parallel to the main member and comprising a longitudinally-aligned plurality of rigid sections, adjacent truss member sections being connected by joints permitting limited swivelling and universal swinging movements therebetween, said truss member sections being connected to adjacent main member sections by joints permitting limited pivotal movements on axes extending longitudinally and transversely of the structure, the centers of universal swinging movements of the joints between adjacent truss member sections being located in and movable in planes extending transversely of the structure and including the axes of joints between adjacent main member sections, the said joints between the truss member sections and main member sections allowing swinging movements of the truss member sections from operative truss-forming positions to inoperative collapsing positions wherein the centers of universal movements between truss member sections are aligned with hinge axes of main member sections whereby longitudinally-spaced truss sections may be placed respectively in their operative and inoperative positions with the centers of universal swinging movements of the intermediate sections defining points in a compound curve that is tangent at one end to a line drawn between centers of universal swinging movements of the joints between a connected plurality of operatively-positioned truss sections and is tangent at its other end to a line drawn between the centers of universal swinging movements of the joints between a connected plurality of inoperatively-positioned truss sections, and latch mechanism independently and releasably locking the side sections in their operative positions.

3. In an elongated structure of the class described, an elongated main member comprising a longitudinally-aligned plurality of rigid sections hinged together for movements on axes extending transversely of the structure, a laterally-spaced plurality of truss members extending generally parallel to the main member and each comprising a longitudinally-aligned plurality of rigid sections, adjacent sections of each truss member being connected by joints permitting limited swivelling and universal swinging movements therebetween, said truss member sections being connected to adjacent main member sections by joints permitting limited pivotal movements on axes extending longitudinally and transversely of the structure, the centers of universal swinging movements of the joints between adjacent truss member sections being located in and movable in planes extending transversely of the structure and including the axes of joints between adjacent main member sections, the said joints between truss member sections and main member sections allowing swinging movements of the truss member sections from operative truss-forming positions to inoperative collapsing positions wherein the centers of universal swinging movements between said truss member sections are aligned with hinge axes of main member sections.

4. The structure defined in claim 3 in further combination with latch mechanism independently and releasably locking the truss member sections in their operative positions.

5. In an elongated structure of the class described, an elongated main member comprising a longitudinally-aligned plurality of rigid sections connected by hinge joints on axes extending transversely of the structure, an elongated truss member generally parallel to the main member and comprising a longitudinally-aligned plurality of rigid sections, joints connecting adjacent truss member sections for limited swivelling and universal swinging movements one in respect to the other, each truss member section being connected to an adjacent main member section by a compound pivot joint having intersecting axes one of which extends longitudinally of the structure and the other of which extends substantially perpendicular to the first-mentioned axes of said compound pivot joint, the centers of universal swinging movements of the joints between adjacent truss member sections being located in and movable in planes extending transversely of the structure and including the axes of hinge joints between adjacent main member sections, the said compound pivot joints between truss member sections and main member sections allowing swinging movements of the truss member sections on their longitudinal axes from operative truss-forming positions to inoperative collapsing positions wherein the centers of universal swinging movements between truss member sections are aligned with the hinge axes of the main member sections.

6. The structure defined in claim 5 in further combination with a latch mechanism independently and releasably locking the truss member sections in their operative positions.

7. The structure defined in claim 5 in which there is a plurality of sectional truss members arranged in laterally-spaced parallel relation, the sections of all truss members being jointed together and to adjacent main member sections in the manner defined.

8. The structure defined in claim 5 in which there is a plurality of sectional truss members arranged in laterally-spaced parallel relation, the sections of all truss members being joined together and to adjacent main member sections in the manner defined and in still further combination with latch mechanism independently and releasably locking the said truss member sections in their operative truss-acting positions.

9. In a collapsible channel-forming structure, a channel bottom and opposite channel sides, the channel bottom and opposite channel sides each being made up of a plurality of rigid sections, adjacent bottom sections being connected by hinge joints having axes of movement extending transversely of the channel, hinge joints connecting adjacent side member sections for relative movements on axes extending substantially perpendicular to the longitudinal direction of the elongated structure of the channel, hinge joints connecting each side section to a laterally-adjacent bottom section for movements on axes extending longitudinally of the extended channel, the said axes of movement of the joints between longitudinally-adjacent side member sections being located in and movable in planes extending transversely of the channel and including the axes of hinge joints between adjacent main member sections, the said side member sections being movable from channel side-forming, truss-acting positions to inoperative collapsing positions wherein the said axes of movement of the joints between side member sections are aligned with the axes of movement of the hinge joints between the bottom sections.

10. The structure defined in claim 9 in further combination with latch mechanism releasably locking the said channel side sections in their operative positions.

11. In a collapsible channel-forming structure, a channel bottom and opposite channel sides, the channel bottom and channel sides being each made up of a plurality of rigid sections, adjacent channel bottom sections being hinged together on axes extending transversely of the channel, adjacent channel side sections being connected by joints permitting limited swivelling and universal swinging movements therebetween, the channel side sections being connected to adjacent cooperating channel bottom sections by joints permitting limited pivotal movements on axes extending longitudinally and transversely of the channel, the centers of universal swinging movements of the joints between adjacent channel side sections being located in and movable in planes extending transversely of the channel structure and including the axes of hinge joints between adjacent bottom sections.

12. In a collapsible channel-forming structure, a channel bottom and opposite channel sides, the channel bottom and channel sides being each made up of a plurality of rigid sections, adjacent channel bottom sections being hinged together on axes extending transversely of the channel, adjacent channel side sections being connected by joints permitting limited swivelling and universal swinging movements therebetween, the channel side sections being connected to adjacent cooperating channel bottom sections by joints permitting limited pivotal movements on axes extending longitudinally and transversely of the channel, the centers of universal swinging movements of the joints between adjacent channel side sections being located in and movable in planes extending transversely of the channel structure and including the axes of hinge joints between adjacent bottom sections, the said joints between the side sections and the bottom sections allowing swinging movements of the side sections from operative channel side-forming truss-acting positions to inoperative channel-collapsing positions wherein the centers of universal swinging movements between the side sections are aligned with the hinge axes between adjacent bottom sections, whereby longitudinally-spaced sections of each side may be placed respectively in their operative and inoperative positions with the centers of universal swinging movements of the intermediate sections defining points in a compound curve that is tangent at one end to a line drawn between centers of universal swinging movements between a connected plurality of operatively-positioned side sections and is tangent at its other end to a line drawn between the centers of universal swinging movements between a connected plurality of inoperatively-positioned side sections, and latch mechanism independently and releasably locking the side sections in their operative positions.

13. In an extension ladder structure, laterally-spaced parallel ladder rails each made up of a plurality of longitudinally-aligned rigid sections hinged together on axes extending transversely of the ladder, the hinge axes of laterally-opposite rail sections being aligned, ladder rungs extending between and rigidly connecting laterally-opposite sections of opposite ladder rails, laterally-spaced truss-acting side members extending substantially parallel to opposite ladder rails, said truss-acting side members each being made up of a plurality of longitudinally-aligned rigid sections connected by joints permitting relative swinging movements on axes extending transversely of the ladder, the side member sections being connected to laterally-adjacent ladder rails by joints permitting relative pivotal movements on axes extending longitudinally of the ladder, the side member sections being movable with respect to the ladder rails from operative truss-acting positions to inoperative collapsing positions wherein the axes of the joints between the side member sections are aligned with the axes between ladder rail sections, and latch mechanism releasably locking said side sections in their operative positions.

14. In an extension ladder structure, laterally-spaced parallel ladder rails each made up of a plurality of longitudinally-aligned rigid sections hinged together on axes extending transversely of the ladder, the hinge axes of laterally-opposite rail sections being aligned, ladder rungs extending between and rigidly connecting laterally-opposite sections of opposite ladder rails, laterally-spaced truss-acting side members extending substantially parallel to opposite ladder rails, said truss-acting side members each being made of a plurality of longitudinally-aligned rigid sections connected by joints permitting limited swivelling and universal swinging movements therebetween, joints connecting the side member sections to laterally-adjacent ladder rails for compound pivotal movements on axes extending longitudinally and transversely of the ladder, the centers of universal swinging movements of the side member joints being located in and movable in planes extending transversely of the ladder and including the axes of adjacent ladder rail section joints, the said truss-acting side member sections being movable with respect to the ladder rails from operative truss-acting positions to inoperative collapsing positions wherein the centers of universal swinging movements between side member sections are aligned with the axes of laterally-adjacent ladder rails.

15. In an extension ladder structure, laterally-spaced parallel ladder rails each made up of a plurality of longitudinally-aligned rigid sections hinged together on axes extending transversely of the ladder, the hinge axes of laterally-opposite rail sections being aligned, ladder rungs extending between and rigidly connecting laterally-opposite sections of opposite ladder rails, laterally-spaced truss-acting side members extending substantially parallel to opposite ladder rails, said truss-acting side members each being made up of a plurality of longitudinally-aligned rigid sections connected by joints permitting limited swivelling and universal swinging movements therebetween, joints connecting the side member sections to laterally-adjacent ladder rails for compound pivotal movements on axes extending longitudinally and transversely of the latter, the centers of universal swinging movements of the side member joints being located in and movable in planes extending transversely of the ladder and including the axes of adjacent ladder rail section joints, the said truss-acting side member sections being movable with respect to the ladder rails from operative truss-acting positions to inoperative collapsing positions wherein the centers of universal swinging movements between side member sections are aligned with the axes of laterally-adjacent ladder rails, whereby longitudinally-spaced truss-acting side sections may be placed respectively in their operative and inoperative positions with the intermediate sections so positioned that the centers of universal swinging movements therebetween will define points on a compound curve tangent at one end to a line drawn between the centers of universal swinging movement of a plurality of operatively-positioned side sections and tangent at its other end to a line drawn between a plurality of inoperatively-positioned side sections, and latch mechanism independently and releasably locking the side sections in their operative positions.

16. The structure defined in claim 1 in further combination with cam-acting guide means progressively acting upon the elongated structure under longitudinal movements thereof in one direction to progressively swing the truss member sections toward their inoperative positions and acting upon the elongated structure under movements thereof in the other direction to progressively swing the truss member sections toward their inoperative positions.

17. The structure dfined in claim 1 in further combination with a supporting structure of very materially less length than the elongated sectional structure and over which the sectional main member is longitudinally movable, and cam-acting guide means carried by the supporting structure and acting upon the sectional truss member under longitudinal movements of the elongated sectional structure in one direction to progressively swing the truss member sections toward their inoperative positions and acting upon the truss member sections under movements of the elongated sectional structure in the other direction to progressively swing the truss member sections toward their operative positions.

18. The structure defined in claim 1 in further combination with a supporting structure of very materially less length than the elongated sectional structure and over which the sectional main member is longitudinally movable, and cam-acting guide means carried by the supporting structure and acting upon the sectional truss member under longitudinal movements of the elongated sectional structure in one direction to progressively swing the truss member sections toward their inoperative positions and acting upon the truss member sections under movements of the elongated sectional structure in the other direction to progressively swing the truss member sections toward their operative positions, said cam-acting guide means involving channel-forming elements between which portions of the truss member sections pass under longitudinal movements of the elongated structure, said channel-forming elements defining points in a compound curve that is tangent at one end to a plane intersecting the centers of universal swinging movements of the joints between a plurality of operatively-positioned truss member sections and is tangent at its other end to a plane intersecting the centers of universal swinging movements of the joints between a plurality of inoperatively-positioned truss member sections.

19. The structure defined in claim 1 in further combination with main member supporting and guiding structure over which the sections of the main member are progressively movable, means for longitudinally advancing and retracting jointed elongated structure, and guideway-forming means laterally between which the portions of the truss member sections pass under longitudinal movements of the elongated structure during passage of the jointed elongated structure over the supporting structure, said guideway-forming means involving guideway portions spaced apart a distance equal to the length of a plurality of truss member sections, one of said guideway portions being operatively positioned to receive therein operatively-positioned truss member sections and the other thereof being positioned to receive therein inoperatively-positioned truss member sections.

20. The structure defined in claim 1 in further combination with main member supporting and guiding structure over which the sections of the main member are progressively movable, means for longitudinally advancing and retracting jointed elongated structure, and guideway-forming means laterally between which the portions of the truss member sections pass under longitudinal movements of the elongated structure during passage of the jointed elongated structure over the supporting structure, said guideway-forming means involving guideway portions spaced apart a distance equal to the length of a plurality of truss member sections, one of said guideway portions being operatively positioned to receive therein operatively-positioned truss member sections and the other thereof being positioned to receive therein inoperatively-positioned truss member sections, said guideway-forming means also involving spaced guideway portions intermediate the first-said guideway portions and so orientated that the centers of the several guideway portions will form points in a compound curve that is tangent at one end to a line drawn between centers of universal swinging movements of a plurality of operatively-positioned truss member sections and at its other end is tangent to a line drawn between the centers of universal swinging movements of a plurality of inoperatively-positioned truss member sections.

21. The structure defined in claim 1 in further combination with main member supporting and guiding structure over which the sections of the main member are progressively movable, means for longitudinally advancing and retracting jointed elongated structure, guideway-forming means laterally between which the portions of the truss member sections pass under longitudinal movements of the elongated structure during passage of the jointed elongated structure over the supporting structure, said guideway-forming means involving guideway portions spaced apart a distance equal to the length of a plurality of truss member sections, one of said guideway portions being operatively positioned to receive therein operatively-positioned truss member sections and the other thereof being positioned to receive therein inoperatively-positioned truss member sections, said guideway-forming means also involving spaced guideway portions intermediate the first-said guideway portions and so orientated that the centers of the several guideway portions will form points in a compound curve that is tangent at one end to a line drawn between centers of universal swinging movements of a plurality of operatively-positioned truss member sections and at its other end is tangent to a line drawn between the centers of universal swinging movements of a plurality of inoperatively-positioned truss member sections, and latch mechanisms independently and releasable locking the truss member sections in their operative positions.

22. The structure defined in claim 1 in further combination with cam-acting guide means between which portions of the truss member sections pass under longitudinal movements of the joined elongated structure, the cam-acting guide means having portions in operative engagement with opposite side portions of the truss member that are spaced longitudinally of the structure a distance equal to the length of several truss member sections, the said longitudinally-spaced cam-acting guide portions being angularly disposed one in respect to the other thereof to cause progressive swinging movements of the truss member sections under longitudinal movements of the structure.

23. The structure defined in claim 1 in further combination with cam-acting guide means between which portions of the truss member sections pass under longitudinal movements of the jointed elongated structure, the cam-acting guide means having portions in operative engagement with opposite side portions of the truss member that are spaced longitudinally of the structure a distance equal to the length of several truss member sections, the said longitudinally-spaced cam-acting guide portions being angularly disposed one in respect to the other thereof to cause progressive swinging movements of the truss member sections under longitudinal movements of the structure, means for advancing and retracting the elongated structure past the said cam-acting guide means, and latch mechanisms independently and releasably locking the truss member sections in their operative positions.

24. In an extension ladder structure, laterally-spaced parallel ladder rails each made up of a plurality of longitudinally-aligned rigid sections hinged together on axes extending transversely of the ladder, the hinge axes of laterally-opposite rail sections being aligned, ladder rungs extending between and rigidly connecting laterally-opposite sections of opposite ladder rails, laterally-spaced truss-acting side members extending substantially parallel to opposite ladder rails, said truss-acting side members each being made up of a plurality of longitudinally-aligned rigid sections connected by joints permitting limited swivelling and universal swinging movements therebetween, joints connecting the side member sections to laterally-adjacent ladder rails for compound pivotal movements on axes extending longitudinally and transversely of the ladder, the centers of universal swinging movements of the side member joints being located in and movable in planes extending transversely of the ladder and including the axes of adjacent ladder rail section joints, the said truss-acting side member sections being movable with respect to the ladder rails from operative truss-acting positions to inoperative collapsing positions wherein the centers of universal swinging movements between side member sections are aligned with the axes of laterally-adjacent ladder rails, whereby longitudinally-spaced truss-acting side sections may be placed respectively in their operative and inoperative positions with the intermediate sections so positioned that the centers of universal swinging movements therebetween will define points that compound curve tangent at one end to a line drawn between the centers of universal swinging movement of a plurality of operatively-positioned side sections and tangent at its other end to a line drawn between a plurality of inoperatively-positioned side sections, latch mechanism independently and releasably locking the side member sections in their operative positions, and means for advancing and retracting the jointed elongated structure with respect to the cam-acting guide means, the last said means comprising rack teeth on the main member sections and a journalled pinion meshing with said rack teeth.

25. In an extension ladder structure, laterally-spaced parallel ladder rails each made up of a plurality of longitudinally-aligned rigid sections hinged together on axes extending transversely of the ladder, the hinge axes of laterally-opposite rail sections being aligned, ladder rungs extending between and rigidly connecting laterally-opposite sections of opposite ladder rails, laterally-spaced truss-acting side members extending substantially parallel to opposite ladder rails, said truss-acting side members each being made up of a plurality of longitudinally-aligned rigid sections connected by joints permitting limited swivelling and universal swinging movements therebetween, joints connecting the side member sections to laterally-adjacent ladder rails for compound pivotal movements on axes extending longitudinally and transversely of the ladder, the centers of universal swinging movements of the side member joints being located in and movable in planes extending transversely of the ladder and including the axes of adjacent ladder rail section joints, the said truss-acting side member sections being movable with respect to the ladder rails from operative truss-acting positions to inoperative collapsing positions wherein the centers of universal swinging movements between side member sections are aligned with the axes of laterally-adjacent ladder rails, whereby longitudinally-spaced truss-acting side sections may be placed respectively in their operative and inoperative positions with the intermediate sections so positioned that the centers of universal swinging movements therebetween will define points on a compound curve tangent at one end to a line drawn between the centers of universal swinging movement of a plurality of operatively-positioned side sections and tangent at its other end to a line drawn between a plurality of inoperatively-positioned side sections, latch mechanism independently and releasably locking the side member sections in their operative positions, means for advancing and retracting the jointed elongated structure with respect to the cam-acting guide means, and a reel on which the elongated structure is wound when the truss member sections are in their inoperative collapsing positions.

26. The structure defined in claim 3 in further combination with means progressively moving the truss member sections toward inoperative positions under retracting movements of the structure in respect thereto and progressively moving the truss member sections toward their operative positions under extended movements of the structure in respect thereto, said means comprising cam-acting guides for each truss member.

27. The structure defined in claim 3 in further combination with a supporting structure of materially-less length than the jointed elongated structure and over which the sectional main member of the elongated structure is longitudinally movable, and cam-acting guide means carried by the supporting structure and acting upon the sectional truss members of the elongated structure under longitudinal movements thereof in one direction to progressively swing the truss member sections toward their inoperative positions and acting upon the sectional truss members under movements of the elongated structure in the other direction to progressively swing the truss member sections toward their operative positions.

28. The structure defined in claim 3 in further combination with a supporting structure of materially-less length than the jointed elongated structure and over which the sectional main member of the elongated structure is longitudinally movable, and cam-acting guide means carried by the supporting structure and acting upon the sectional truss members of the elongated structure under longitudinal movements thereof in one direction to progressively swing the truss member sections toward their inoperative positions and acting upon the sectional truss members under movements of the elongated structure in the other direction to progressively swing the truss member sections toward their operative positions, said cam-acting guide means involving channel-forming elements between which portions of the sections of each truss member pass under longitudinal movements of the elongated structure, the transverse centers of channel-forming elements for each truss member defining points in a compound curve that is tangent at one end to a plane intersecting the centers of universal swinging movements of a plurality of operatively-positioned sections of its truss member and is tangent at its other end to a plane intersecting the centers of universal swinging movements of a plurality of inoperatively-positioned truss member sections.

29. In an elongated structure of the class described, an elongated main member comprising a longitudinally-aligned plurality of rigid sections connected by hinge joints for movements on axes extending transversely of the extended structure; an elongated truss member generally parallel to the main member and comprising a longitudinally-aligned plurality of rigid sections connected by universal joints, said universal joints each comprising the bifurcated member carried by one section, a cooperating tongue member carried by the adjacent section and working in the said bifurcated member, a pivot pin extending between spaced portions of the bifurcated member and having its axes extending substantially perpendicular to the longitudinal direction of the extended structure, a spherical ring concentrically mounted on said pin within said bifurcated member and seated in a mating spherical socket in the said tongue member, said spherical ring and tongue member being free for unitary limited axial sliding movements on said pin within said bifurcated member; compound pivot joints connecting the truss member sections to adjacent main member sections, said compound pivot joints each comprising a body pivotally mounted on adjacent main member section on an axis extending generally parallel to the longitudinal direction of that section and the extended structure, a shank rigid with the adjacent truss member section and mounted in said pivoted body for pivotal and limited axial sliding movements in said pivoted body on an axis extending generally perpendicular to the axis of the said pivoted body and parallel to the axes of the said pivot pin of the universal joints between adjacent sections; and latch mechanism independently and releasably locking the truss member sections in operative positons, said latch mechanism each comprising a universal joint shank, a latch detent carried by and projecting from a projected end portion of said universal joint shank, an element carried by the adjacent main member section and having a generally-segmental surface about which said latch detent is adapted to travel under lateral swinging movements of the adjacent truss member section and having a notch adapted to receive the latch detent under outward sliding movements of the shank in the pivoted body, and yielding means biasing the shank to move outwardly toward latch-locking position.

KARL O. LARSON.

REFERENCES CITED

The following references are of record in the file of this patent:

UNITED STATES PATENTS

| Number | Name | Date |
| --- | --- | --- |
| 2,143,953 | Le Roy | Jan. 17, 1939 |